United States Patent
Fraley, IV et al.

(10) Patent No.: US 12,348,800 B2
(45) Date of Patent: Jul. 1, 2025

(54) AUTOMATED ESCALATED POLICY ENFORCEMENT

(71) Applicant: Level 3 Communications, LLC, Broomfield, CO (US)

(72) Inventors: Taylor Fraley, IV, Erie, CO (US); Theresa MacDonald, Little Canada, MN (US); Diane Walvatne, Orono, MN (US)

(73) Assignee: Level 3 Communications, LLC, Denver, CO (US)

( * ) Notice: Subject to any disclaimer, the term of this patent is extended or adjusted under 35 U.S.C. 154(b) by 348 days.

(21) Appl. No.: 17/935,209

(22) Filed: Sep. 26, 2022

(65) Prior Publication Data

US 2023/0209112 A1 Jun. 29, 2023

Related U.S. Application Data

(60) Provisional application No. 63/294,497, filed on Dec. 29, 2021.

(51) Int. Cl.
*H04L 29/06* (2006.01)
*H04L 9/40* (2022.01)
*H04N 21/239* (2011.01)
*H04N 21/2743* (2011.01)

(52) U.S. Cl.
CPC ......... *H04N 21/2396* (2013.01); *H04L 63/10* (2013.01); *H04L 63/20* (2013.01); *H04N 21/2743* (2013.01)

(58) Field of Classification Search
CPC ....... H04L 63/10; H04L 63/20; H04L 63/145; H04L 63/108; H04L 63/0263; H04L 63/105
USPC .......................................................... 726/1
See application file for complete search history.

(56) References Cited

U.S. PATENT DOCUMENTS

| | | | |
|---|---|---|---|
| 2003/0126086 A1* | 7/2003 | Safadi ................ | G06F 21/1063 705/57 |
| 2012/0030187 A1* | 2/2012 | Marano ................ | G06F 16/986 707/E17.014 |

FOREIGN PATENT DOCUMENTS

JP P 2007-122228 A * 5/2007

* cited by examiner

*Primary Examiner* — Longbit Chai

(57) ABSTRACT

The present disclosure describes a system and method for providing automated policy enforcement. The system and method may be implemented by a service provider to enforce a policy related to copyright infringement activities. According to an example, the policy may define a system of penalty (strike) levels for violations of the policy up to a maximum number of strikes. When a notification of a policy violation is received, the system may operate to determine whether to issue a strike in association with the notification. When a determination is made to issue a strike in association with a received notification a set of enforcement actions to perform in association with the issued strike may be selected and executed. The set of enforcement actions may terminate detected copyright infringement activities and reduce or otherwise limit the service provider's liabilities when such copyright infringement activities may occur.

18 Claims, 5 Drawing Sheets

AUTOMATED ESCALATED POLICY ENFORCEMENT

CROSS-REFERENCE TO RELATED APPLICATIONS

This application claims the benefit of U.S. Provisional Application No. 63/294,497 filed Dec. 29, 2021, entitled "Automated Escalated Policy Enforcement," which is incorporated herein by reference in its entirety.

BACKGROUND

A Network Service Provider (NSP) may, in addition to providing online services or network access, provide their clients a means to make content (e.g., photos, videos, and music) available over the Internet to the public at large. For example, the NSP may allow its clients to upload content to their publicly accessible servers, where this content may then be accessed, and sometimes copied, by members of the general population. Problems can arise when a client abuses this privilege and posts material that may violate copyright laws, such as the Digital Millennium Copyright Act (DMCA). For example, under DMCA, web users cannot legally upload content that does not belong to them without the content owner's permission (and in a way that is not covered by Fair Use). As a provider of network connectivity and of the publicly accessible servers, the NSP may be at risk of liability when its clients violate such copyright laws and upload content to the NSP's servers without the content owners' authorization. It is consideration of these and other issues that various aspects of the present disclosure were developed.

SUMMARY

The present disclosure describes a system and method for providing automated policy enforcement. The system and method may be implemented by a service provider to automatically perform policy enforcement actions to terminate detected copyright infringement activities and to reduce or otherwise limit the service provider's liabilities when such copyright infringement activities may occur.

Accordingly, the present disclosure describes a system for providing automated policy enforcement, the system comprising: at least one processor; a memory connected to the at least one processor including computer-readable instructions that, when executed by the at least one processor, operate to: receive a notification reporting a policy-violating activity performed by a policy violator in association with content; validate the notification; remove the content; determine a set of enforcement actions to perform in response to the policy-violating activity; and execute the determined set of enforcement actions.

The present disclosure further describes a method for providing automated policy enforcement, comprising: receiving a notification reporting a policy-violating activity performed by a policy violator in association with content; extracting an IP address of the policy violator and a date and time of the policy-violating activity from the notification; determining whether the IP address of the policy violator matches a dynamic IP address assigned to a customer at the date and time; and when a match is determined, obtaining customer information of the policy violator; removing the content; determining a set of enforcement actions to perform in response to the policy-violating activity; and executing the determined set of enforcement actions.

The present disclosure further describes a computing system for providing automated policy enforcement, the computing system operative to: receive a notification reporting a policy-violating activity performed by a policy violator in association with content; remove the content; increment a strike level associated with the policy violator; determine a set of enforcement actions to perform based on the incremented strike level; and execute the determined set of enforcement actions, wherein: the enforcement actions associated with the first strike level include: a block of the policy violator's network access by assigning the policy violator to a walled garden according to a first set of walled garden configurations until one or more release conditions have been satisfied; and a first warning notification provided to the policy violator; the enforcement actions associated with the second strike level include: a block of the policy violator's network access by assigning the policy violator to a walled garden according to a second set of walled garden configurations until one or more release conditions have been satisfied; and a second warning notification provided to the policy violator; the enforcement actions associated with the third strike level include: a block of the policy violator's network access by assigning the policy violator to a walled garden according to a third set of walled garden configurations until one or more release conditions have been satisfied; and a third warning notification provided to the policy violator; the enforcement actions associated with the fourth strike level include: a block of the policy violator's network access by assigning the policy violator to a walled garden according to a fourth set of walled garden configurations until one or more release conditions have been satisfied; and a fourth warning notification provided to the policy violator; and the enforcement actions associated with the fifth strike level include: a block of the policy violator's network access by assigning the policy violator to a walled garden according to a fifth set of walled garden configurations; and a termination of the policy violator's service.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Aspects of an automated policy enforcement system and method are disclosed that may be implemented to ensure compliance with a policy relating to reported copyright infringement activities. For example, the automated policy enforcement system may be configured to automatically perform policy enforcement actions to terminate reported copyright infringement activities and to block network access by a client in violation of the policy for thwarting subsequent violations of the policy by that client and reducing or otherwise limiting the service provider's liabilities when such copyright infringement activities may occur. When a client of the service provider uploads content that does not belong to them without the content owner's permission (and in a way that is not covered by Fair Use), the client may be in violation of copyright laws, such as the Digital Millennium Copyright Act (DMCA). Some non-limiting examples of DMCA violations include: using copyrighted photos in a blog post; plagiarizing written content from another site; and adding unlicensed music or videos to a site for others to stream or download. As a provider of network connectivity and of the publicly accessible servers, the service provider may be at risk of some liability when its clients violate such copyright laws. Accordingly, the service provider may utilize the automated policy enforcement system to ensure compliance with a policy, such as the DMCA, to reduce or otherwise limit the service provider's liability by determining and performing a set of policy enforcement actions in response to a reported policy violation. These and other examples will be explained in more detail below with respect to FIGS. 1-5. It will be appreciated that the examples shown by the figures and described herein may be used across the various implementations described herein.

Figure 1:
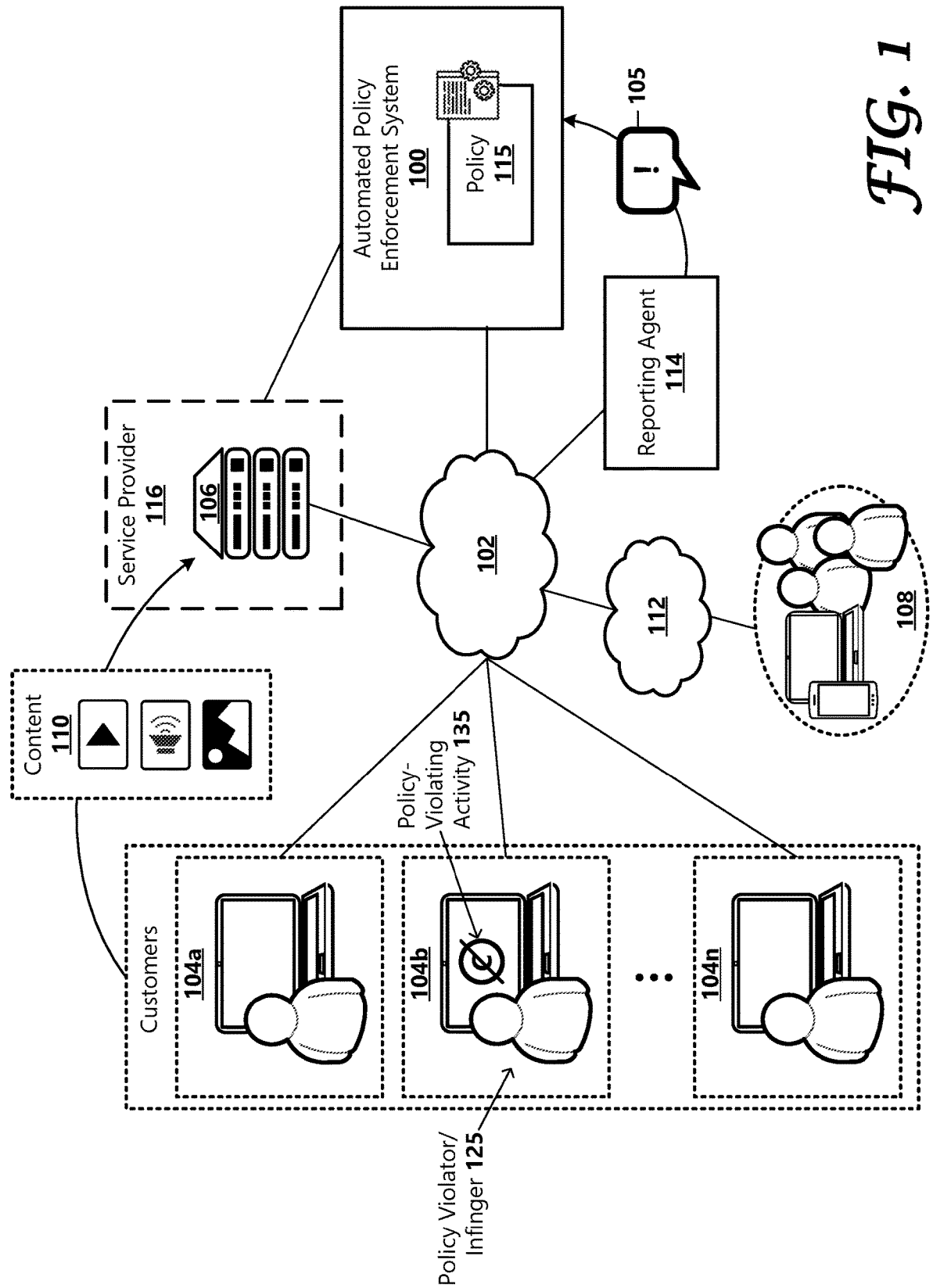
FIG. 1 is an example operating environment including an automated policy enforcement system for providing automated policy enforcement according to an embodiment.

FIG. 1 is a block diagram illustrating a networked computing environment in which an automated policy enforcement system 100 may be implemented for providing automated policy enforcement according to an example. In general, the automated policy enforcement system 100 may operate to receive notifications 105 that may report a policy violation (e.g., copyright infringement activity), respond expeditiously to remove, or disable access to, content 110 that is claimed to be the subject of the policy violation, and to determine and execute one or more enforcement actions to handle identified repeat policy violations.

In some examples, the automated policy enforcement system 100 may be implemented by a service provider 116, such as the service provider of a network 102 or networks. According to an example, the service provider 116 may be an entity offering the transmission, routing, or providing of connections for digital online communications, between or among clients and servers connected to the network 102. According to another example, the service provider 116 may be a provider of online services or Internet Protocol (IP) based network 102 access, or the operator of facilities therefore. The network(s) 102, for example, may provide various services to customers 104a-n (generally, 104) of the network 102, including transmission of communications between network devices, network services, network computing environments, cloud services, such as storage services, networking services, compute services, and the like. A customer 104 may include purchaser of online services or network 102 access from the service provider 116. The customer 104, for example, may include an individual, an enterprise, a multiple-dwelling unit (MDU), or the like. To provide such services, various networking components and other devices may be interconnected and configured within the network(s) 102. The customer 104 may include a computing system, a Local Area Network (LAN), or another network that, via an access point provided by the service provider 116, may access network devices and resources available on the network 102 and other networks 112.

In some examples, the service provider 116 may allow customers 104 to upload content 110, which may include material, such as photos, videos, and music, to one or more publicly accessible servers 106. For example, the servers 106 may be owned or used by the service provider 116 as part of providing various services to customers 104 of its network 102. This content 110 may then be accessed, and sometimes copied, by members of the general population, such as end users 108 connected to the network 102 or another network 112. According to an aspect, the content 110 may be protected against copying and other unauthorized uses under copyright law (e.g., the DMCA). For example, when a customer 104 uploads protected content 110 that does not belong to them without the content owner's permission or in a way that is not covered by Fair Use, the customer 104 may be in violation of copyright law.

The automated policy enforcement system 100 may operate to receive notifications 105 of violations of a policy 115 (herein referred to as policy-violating activity 135). In some examples, the policy 115 may define rules that ensure compliance with copyright law, such as the DMCA. For instance, the policy-violating activity 135 being reported in the notification 105 may be related to copyright infringement. In some examples, a notification 105 may be received from a reporting agent 114. The reporting agent 114 may be one of various reporting agents that may operate to monitor and report on policy-violating activity 135, such as infringement activity, associated with content 110. In some examples, the reporting agent 114 can include an owner of content or an agent of the owner of content 110. In other examples, the reporting agent 114 may be another trusted entity. The notification 105 may include information that may notify the service provider 116 of alleged policy-violating activity 135 in association with a policy violator 125 (sometimes referred to as an infringer), which may be a customer 104b of the service provider 116 as shown in FIG. 1. The automated policy enforcement system 100 may further operate to perform various operations described below to respond expeditiously to remove, or disable access to, the content 110 that is the subject of the reported policy-violating activity 135, and to determine and enforce a set of escalated policy enforcement actions to handle identified repeat policy-violating activity 135 by a customer 104.

Figure 2:
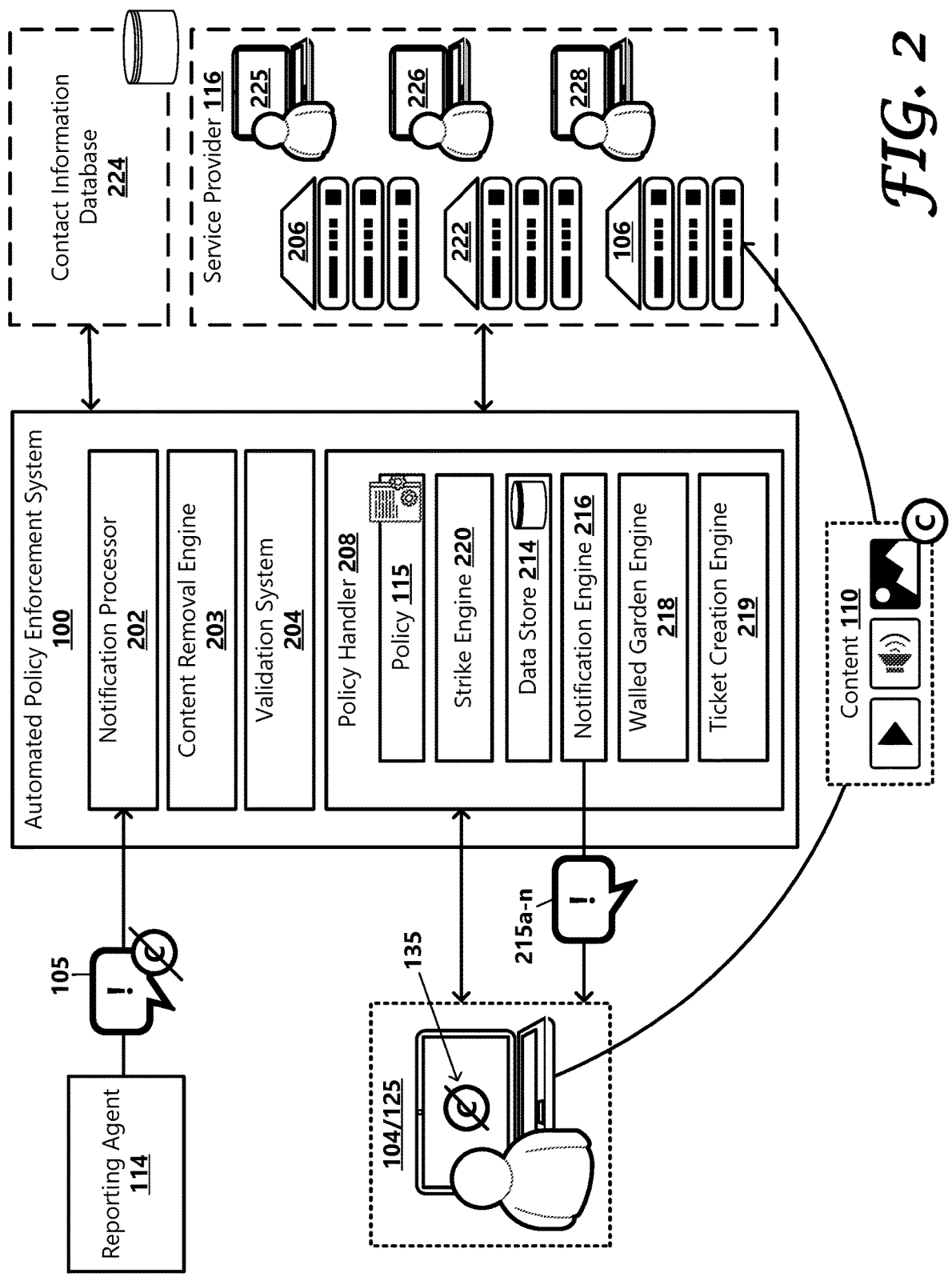
FIG. 2 is a block diagram illustrating various components of an example automated policy enforcement system according to an embodiment.

Components of an example automated policy enforcement system 100 and example policy enforcement actions are described now with reference to FIG. 2. As shown in FIG. 2, a customer 104 may be involved in policy-violating activity 135 associated with a piece of content 110 (e.g., activity that is in violation of the policy 115 implemented by a service provider 116). As described above, the policy 115 may be a copyright policy compliant with copyright law (e.g., the DMCA), the content 110 may be protected against copying and other unauthorized use, and the policy-violating activity 135 may be related to infringement activity of the content 110. The policy 115 may define a set of rules for acceptable and/or unacceptable activity in association with copyright-protected content 110, wherein a violation of the policy 115 may be related to unacceptable activity by the customer 104 in association with a piece of copyright-protected content 110. For instance, the customer 104 may use infrastructure (e.g., network 102, server 106) and/or services provided by the service provider 116 to make the content 110 available online without authorization of the copyright owner of the content 110. In some examples, policy-violating activity 135 associated with the content 110 may be detected and reported to the automated policy enforcement system 100 by a reporting agent 114. The reporting agent 114 may report policy-violating activity 135, such as detected infringement activity, via a notification 105 transmitted to the automated policy enforcement system 100. The notification 105, for example, may be a communication received in the form of an email, a text message, a data file, a voice message, or another type of electronic communication. In other examples, the notification 105 may be comprise a form provided on a site hosted by the service provider 116 and filled out by the reporting agent 114.

According to an example and as shown in FIG. 2, the automated policy enforcement system 100 may include a notification processor 202 operative or configured to receive a notification 105 of policy-violating activity 135 (one or a plurality of activity) related to a piece of content 110 and to extract attributes about the claimed policy-violating activity 135 from the notification 105. Example attributes that may be included in and extracted from the notification 105 may include information about the content 110 (e.g., title, file name, uniform resource locator (URL) of the content) associated with the reported policy-violating activity 135, an IP address used by the policy violator 125 in association with the reported policy-violating activity 135, and a date and time of the policy-violating activity 135, etc. In some examples, an identifier associated with the reporting agent 114 may also be included the notification 105.

In some examples, the notification processor 202 may operate to receive a notification 105 that is in an unstructured format. The notification 105 may include one or more text fields that may include unstructured data describing attributes about policy-violating activity 135. According to one example, the notification processor 202 may operate to use standard expression patterns to scrape the notification 105 for policy violation attributes. In some examples, the standard expression patterns used to scrape the notification 105 may be selected based on the particular reporting agent 114. For example, the notification processor 202 may be configured to identify the reporting agent 114 associated with the notification 105 (e.g., based on the reporting agent identifier included in the notification) and utilize a reporting agent-specific set of standard expression patterns to extract attributes from the notification 105. In some examples, at least a portion of the standard expression patterns may be learned using machine learning techniques. In other examples, the notification processor 202 may operate to receive a notification 105 that is in a structured format and extract attributes about the policy-violating activity 135 included in fixed fields of the notification 105.

In some examples, the automated policy enforcement system 100 may further comprise a validation system 204 operative or configured to validate the notification 105 using one or more extracted attributes. According to one example, the IP address corresponding to the reported policy-violating activity 135 may be extracted from the notification 105 and used by the validation system 204 to determine whether the IP address was assigned to a customer 104 of the service provider 116. For example, the validation system 204 may match the IP address attribute extracted from the notification 105 to an IP address (such as a dynamic IP address) assigned by the service provider 116 to a customer 104. For example, dynamic IP address assignment information may be stored in one or more backend servers 206, and the validation system 204 may operate to query the one or more backend servers 206 for customer information associated with the IP address extracted from the notification 105.

In some examples, other attributes may be extracted from the notification 105 and used by the validation system 204 to validate the notification 105. For example, date/time information associated with when the alleged policy-violating activity 135 was detected may be extracted from the notification 105 and used in combination with the IP address to identify a specific customer 104 that was assigned the (dynamic) IP address at that date/time. In some examples, the customer 104 may be identified by a customer identifier (ID). When the IP address is linked to a customer ID, the validation system 204 may use the customer ID to obtain various customer information from a customer account associated with the customer ID from the one or more backend servers 206. The customer information may be associated with the account holder, and may include, for example, the account holder's name, a mailing address, an email address, user identifier(s) (e.g., an account number, a username, a user identifier (ID)), category of service information, billing information, etc. In some examples, the validation system 204 may provide the obtained customer information to a policy handler 208 operative or configured to handle enforcement of the policy 115. Or, in other examples, the validation system 204 may provide the customer ID linked to the IP address to the policy handler 208, and the policy handler 208 may operate to obtain the customer information corresponding to the customer ID.

In some examples, the automated policy enforcement system 100 may further comprise a content removal engine 203 operative or configured to remove the content 110 reported to be in violation of the policy 115. For example, when a notification of policy-violating activity 135 is received, the content removal engine 203 may use information about the content 110 received in the notification 105 to remove the content 110 from the service provider server(s) 106 or otherwise prevent access to the content 110.

According to an aspect, in addition to defining rules for acceptable and/or unacceptable activity in association with copyright-protected content 110, the policy 115 may further define a system of penalty levels for violations of the policy 115. For example, the penalty levels may be referred to herein as "strikes," wherein a first strike may be issued to the policy-violating customer 104 (e.g., the policy violator 125) in relation to a first reported policy-violating activity 135 in association with a piece of copyright-protected content 110, a second strike may be issued in relation to a second reported policy-violating activity 135, and so on up to a predefined maximum number (n) of strikes. In some examples, when a strike is issued to a policy violator 125, a strike level associated with the policy violator 125 may be incremented up to a maximum strike level (n). In some examples, a determination of the strike level that a policy violator 125 may be incremented to and a corresponding set of enforcement actions that may be performed may be based at least in part on previous penalties issued against the policy violator 125 in association with previous copyright violations. In some examples, the policy handler 208 may include strike engine 220 that may operate to determine whether to issue a strike in association with the notification 105 and, when a determination is made to issue a strike in association with a received notification 105, may further operate to determine a set of actions to perform in association with the issued strike.

According to some examples, the policy handler 208 may further include a notification engine 216 and a walled garden engine 218 that may operate to execute actions related to enforcing the policy 115 as determined. These actions are referred to herein as enforcement actions. In some examples and as will be described below in further detail, each strike level may correspond with a specific set of enforcement actions. The enforcement actions, for example, may comply with copyright law. In some examples, a set of enforcement actions corresponding to the maximum number of strikes may include network service termination.

The notification engine 216, for example, may be configured to generate one or more communications (e.g., warning notifications 215a-n, generally, 215) that may be transmitted to the policy violator 125. The warning notifications 215 may, for example, may include information that may inform the policy violator 125 that the policy 115 has been violated, the associated content 110 has been removed, one or more enforcement actions have been implemented, and/or warn the policy violator 125 against continued policy-violating activity 135. For instance, the warning notifications 215 may be in the form of an email message, a text message, an audio message, or other communication.

The walled garden engine 218, for example, may be configured to assign the policy violator 125 to a walled garden. The term "walled garden" may herein be used to describe an enclosed environment in which the customer's access to websites and web services may be prevented, restricted, or otherwise controlled by the service provider 116 according to one or more walled garden configuration. In some examples, when the policy violator 125 is assigned to the walled garden, the policy violator 125 may only be able to access allowed websites that may be included in the walled garden until one or more release conditions associated with the corresponding issued strike level have been satisfied. In some examples, the walled garden configurations may include a time limit for the policy violator 125 to perform the one or more release conditions. For example, when the time limit has passed and the policy violator 125 has not performed the one or more release conditions, a disconnect process may be initiated to disconnect the policy violator's account from service. According to an example, prior to initiating the disconnect process, the policy violator's contact information and billing information may be obtained and provided to a customer service agent 225 or other appropriate entity for contacting the policy violator 125 and notifying the policy violator 125 about the disconnection. Example release conditions associated with various strike levels are described below.

In some examples, the walled garden engine 218 may operate to initiate one or more network access configuration changes that may block a default HTTP port on the policy violator's network gateway and redirect the policy violator 125 to an allowed website. The allowed website, for example, may be hosted on a service provider server 222 and may provide information to the policy violator 125 about the policy violation and instructions for release from the walled garden. In other examples, the walled garden engine 218 may instruct a Domain Name System (DNS) server to respond to the policy violator's DNS requests with an address of the allowed website. According to another example, customer traffic may normally be directed through the walled garden, which may be configured by default to not restrict customers' access to requested network resources. In this case, when a strike is issued against a policy violator 125, the walled garden engine 218 may configure the walled garden to restrict the policy violator's access to the allowed website. Other methods of implementing the walled garden are possible and are within the scope of the present disclosure. In some examples, the policy handler 208 may be configured to communicate with other various systems of the service provider 116 to automatically perform determined enforcement actions.

One example set of strike levels and the associated enforcement actions and release conditions are now described. According to the example, a first set of enforcement actions corresponding to a first strike level may include restricting the policy violator's access to network service by assigning the policy violator 125 to the walled garden according to a first set of walled garden configurations and providing a first warning notification 215a to the user policy violator 125. The first set of walled garden configurations may include a block of all network access, with the exception of the allowed website, until a self-acknowledgement is complete. In some examples, the first warning notification 215a may include a link to the allowed website. For instance, the allowed website may include a violation acknowledgement document that may describe the policy 115 and the policy-violating activity 135, and may further provide an acknowledgement control or field that the policy violator 125 can use to provide an input to indicate acknowledgement of being informed about the policy 115 and the activity in violation of the policy 115. The policy violator's input of the acknowledgement, for example, may be communicated to the walled garden engine 218, and may satisfy the release conditions for the first strike level. When an indication of the acknowledgement is received, the walled garden engine 218 may operate to release the policy violator 125 from the walled garden, which may remove network access restrictions placed on the policy violator 125.

Continuing with the example, a second set of enforcement actions corresponding to a second strike level may be similar to the first set of enforcement actions corresponding to the first strike level. For instance, the second set of enforcement actions may include restricting the policy violator's access to network service by assigning the policy violator 125 to the walled garden according to a second set of walled garden configurations and providing a second warning notification 215b to the user policy violator 125. The second set of walled garden configurations may include a block of all network access, with the exception of the allowed website, until a self-acknowledgement is complete. For example, the second set of walled garden configurations may allow for the policy violator 125 to self-release from the walled garden via the acknowledgement.

A third example set of enforcement actions corresponding to a third strike level may include restricting the policy violator's access to network service by assigning the policy violator 125 to the walled garden according to a third set of walled garden configurations and providing a third warning notification 215c to the user policy violator 125. The third set of walled garden configurations may be escalated to include a block of all network access, with the exception of the allowed website, until a first consultation is complete. The first consultation, for example, may be with a technical support agent 226 or other appropriate entity. For instance, in some examples, the allowed website and/or the third warning notification 215c may include a link or contact information for the technical support agent 226 or other appropriate entity and may instruct the policy violator 125 to contact the technical support agent 226 or other appropriate entity in order to be released from the walled garden. In other examples, the policy handler 208 may include or be in communication with a ticket creation engine 219 that may operate to generate a ticket that may be communicated to the technical support agent 226 or other appropriate entity. The ticket, for example, may notify the technical support agent 226 or other appropriate entity to contact the policy violator 125 and may include contact information for the policy violator 125, which may be obtained from the customer information. In some examples, prior to generating the ticket, the policy violator's contact information may be verified. For instance, the policy violator's contact information may be verified against one or more contact information databases 224 and corrected if the contact information is not up-to-date. Accordingly, the technical support agent 226 or other appropriate entity may be provided with the accurate contact information for the policy violator 125. The technical support agent 226 or other appropriate entity may counsel the policy violator 125 about the policy 115, the third policy-violating activity 135, and warn the policy violator 125 about consequences of further policy-violating activity. In some examples, after completing the first consultation, an indication that the first consultation has been completed may be initiated by the technical support agent 226 and communicated to the walled garden engine 218, which may operate to release the policy violator 125 from the walled garden and remove network access restrictions placed on the policy violator 125.

A fourth set of enforcement actions corresponding to a fourth strike level may include restricting the policy violator's access to network service by assigning the policy violator 125 to the walled garden according to a fourth set of walled garden configurations and providing a fourth warning notification 215c to the user policy violator 125. The fourth set of walled garden configurations may include blocking all network access, with the exception of the allowed website, until a second consultation is complete. The second consultation, for example, may be with a trust and safety agent 228 or other appropriate entity. For instance, in some examples, the allowed website and/or the fourth warning notification 215d may include a link or contact information for the trust and safety agent 228 or other appropriate entity and may instruct the policy violator 125 to contact the trust and safety agent 228 or other appropriate entity in order to be released from the walled garden. In other examples, a ticket may be generated by the ticket creation engine 219 and communicated to the trust and safety agent 228 or other appropriate entity. The ticket, for example, may notify the trust and safety agent 228 or other appropriate entity to contact the policy violator 125 and may include contact information for the policy violator 125. In some examples, prior to providing the policy violator's contact information to the trust and safety agent 228, the contact information may be verified. For instance, the policy violator's contact information may be verified against one or more contact information databases 224 and corrected if the contact information is not up-to-date. The trust and safety agent 228 or other appropriate entity may counsel the policy violator 125 about the policy 115, the fourth policy-violating activity 135, and warn the policy violator 125 about consequences of further policy-violating activity (e.g., termination of service). In some examples, after completing the second consultation, an indication that the second consultation has been completed may be initiated by the trust and safety agent 228 and communicated to the walled garden engine 218, which may operate to release the policy violator 125 from the walled garden and remove network access restrictions placed on the policy violator 125.

According to the example, a fifth set of enforcement actions corresponding to a fifth strike level may include a disconnection of service. For example, a fifth warning notification 215e may be provided to the policy violator 125 that may include a notice that the policy violator's service with the service provider 116 will be terminated after a predetermined time period. For example, a ticket may be generated by the ticket creation engine 219 and communicated to a billing system or other appropriate entity of the service provider 116. The ticket, for example, may instruct the billing system or other appropriate entity to terminate the policy violator's network service. In some examples, when a customer's service has been terminated due to a maximum number (n) of policy violations, the customer/policy violator 125 may not be able to reconnect their service with the service provider 116.

Figure 3:
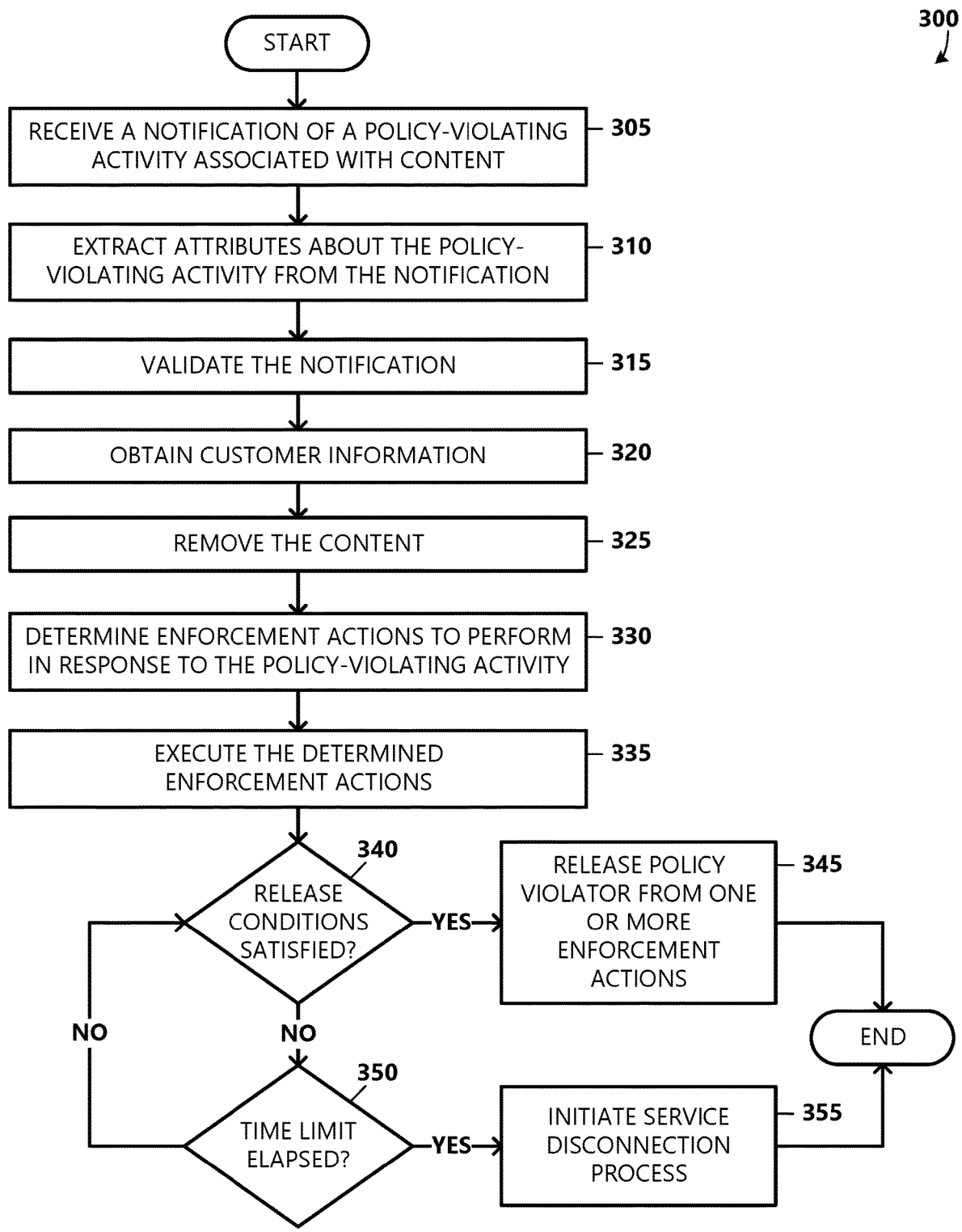
FIG. 3 is a flowchart illustrating an example method for providing automated policy enforcement according to an embodiment.

Having described example components of the automated policy enforcement system 100 and an example set of strike levels and associated enforcement actions and release conditions, an example method 300 of operations that may be executed by the automated policy enforcement system 100 for providing automated policy enforcement according to an embodiment. As should be appreciated, the method 300 can include more or fewer operations or can arrange the order of the operations differently than those shown in FIG. 3. With reference now to FIG. 3, at OPERATION 305, a notification 105 of a policy-violating activity 135 may be received. The policy-violating activity 135, for example, may be related to content 110 protected against copying and other unauthorized uses, and the policy 115 that the activity is in violation of may be implemented by a service provider 116 to protect against such unauthorized uses. The notification 105 may include various attributes about the claimed policy-violating activity 135, such as a title, file name, and/or URL of the content 110 associated with the reported policy-violating activity 135, an IP address used by the policy violator 125 in association with the reported policy-violating activity 135, a date and time of the policy-violating activity 135, etc., which may be extracted from the notification 105 at OPERATION 310. In some examples, standard expression patterns may be used to scrape the notification 105 for the policy violation attributes. In some examples, the standard expression patterns may be selected based on a particular reporting agent 114 from which the notification 105 is received.

At OPERATION 315, the notification 105 may be validated using one or more of the extracted attributes. For example, the IP address used by the policy violator 125 and the date and time of the policy-violating activity 135 may be used to determine whether the IP address matches an IP address (such as a dynamic IP address) assigned by the service provider 116 to a customer 104 and to identify the specific customer 104 that was assigned the (dynamic) IP address at that date/time.

At OPERATION 320, a customer ID may be determined and used to obtain various customer information about the policy violator 125 from the one or more backend servers 206, such as the account holder's name, a mailing address, an email address, a telephone number, user identifier(s) (e.g., an account number, a username, a user identifier (ID)), category of service information, billing information, etc.

At OPERATION 325, the content 110 of the claimed policy-violating activity 135 may be removed or otherwise prevented from being accessed.

At OPERATION 330, a set of enforcement actions in response to the policy-violating activity 135 may be determined. For example, the set of enforcement actions may be determined based at least in part on the policy violator's category of service information. The category of service information, for example, may define whether the policy violator 125 is categorized as a residential, multiple-dwelling unit (MDU), business-class, enterprise-class, or a dedicated Internet Access Service (DIA) class customer 104. According to one example implementation, when the policy violator 125 is categorized as a residential customer 104, the policy violator 125 may be eligible for being issued a strike and, in some examples, being assigned to a walled garden, where the policy violator's access to the network 102 may be prevented, restricted, or otherwise controlled according to one or more walled garden configurations. An example method of operations that may be executed for determining the set of enforcement actions is described below with reference to FIG. 4.

At OPERATION 335, the set of enforcement actions may be executed. The determined set of enforcement actions may be in compliance with the policy 115, and may reduce or otherwise limit the service provider's liability in association with the reported policy violation. According to an example, the notification engine 216 may be used to generate and transmit a warning notification 215 to the policy violator 125, the walled garden engine 218 may be used to assign the policy violator 125 to a walled garden according to one or more walled garden configurations, and/or the ticket creation engine 219 may be used to generate a ticket that may be communicated to an appropriate entity (e.g., a customer service agent 225, a technical support agent 226, a trust and safety agent 228) to perform one or more of the enforcement actions.

At DECISION OPERATION 340, a determination may be made as to whether one or more release conditions corresponding to the determined and executed set of enforcement actions have been satisfied. The one or more release conditions, for example, may include an acknowledgment of the policy violation or a consultation with a customer service agent 225, a technical support agent 226, a trust and safety agent 228, or other appropriate entity. When a determination is made that the policy violator 125 has completed the one or more release conditions, the policy violator 125 may be released from one or more of the enforcement actions at OPERATION 345. For example, if the policy violator 125 has been assigned to the walled garden, they may be released from the walled garden.

When a determination is made that the policy violator 125 has not completed the one or more release conditions, a determination may be made at DECISION OPERATION 350 as to whether a time limit associated with one or more of the enforcement actions has elapsed. For example, the time limit may be associated with the walled garden. When a determination is made that the time limit has elapsed and the one or more release conditions corresponding to the enforcement actions have not been satisfied, the policy violator's service may be disconnected at OPERATION 355. For example, the ticket creation engine 219 may be used to generate a ticket that may initiate the service disconnection process.

Figure 4:
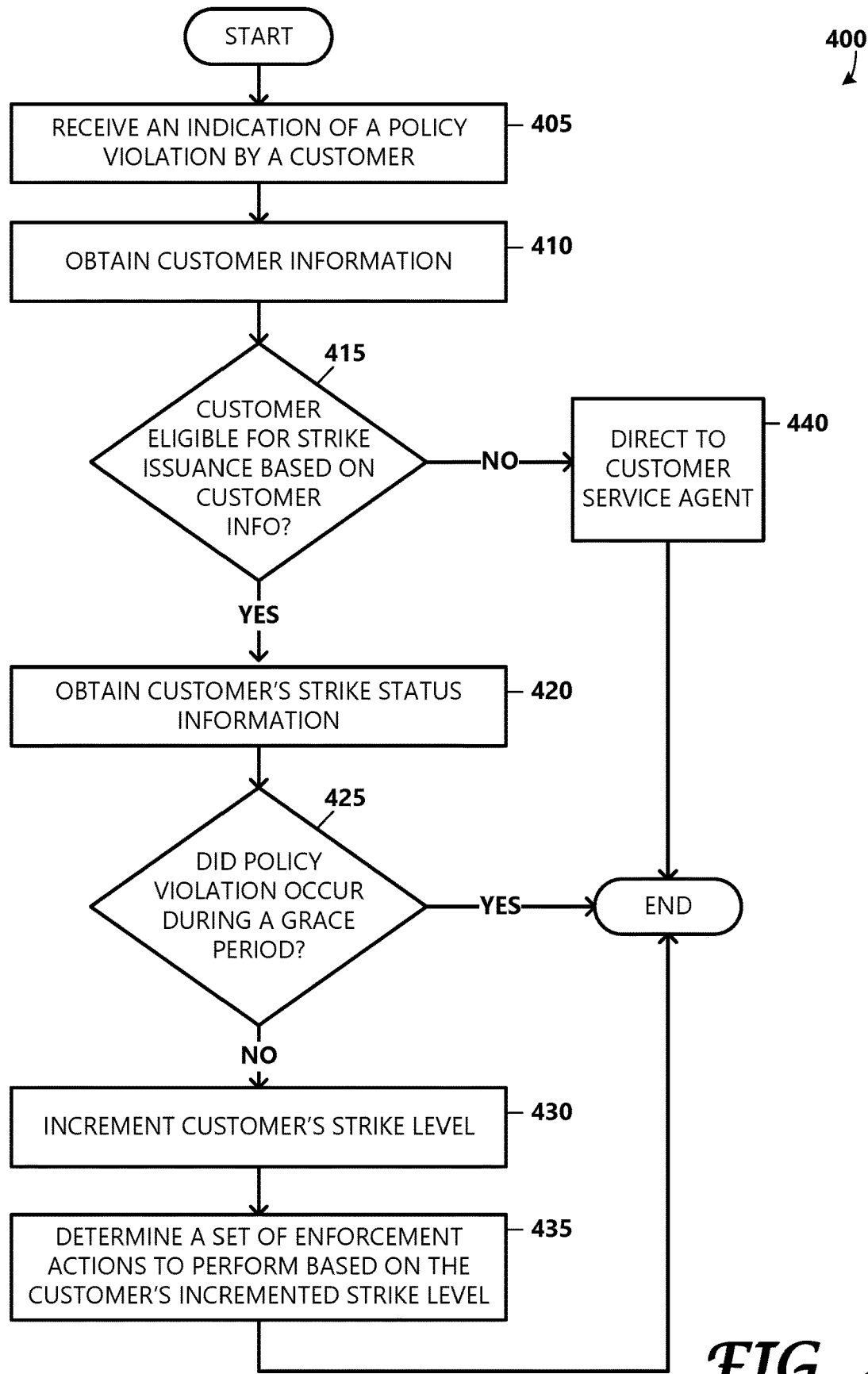
FIG. 4 is a flowchart illustrating an example method for determining a set of enforcement actions to perform in response to a reported policy violation according to an embodiment.

One example method 400 of operations that may be executed at OPERATION 330 in FIG. 3 for determining the set of enforcement actions is shown in FIG. 4. For example, the operations described in FIG. 4 may be performed for determining whether to issue a strike in association with a received notification 105 and, when a determination is made to issue a strike in association with a received notification 105, for determining the set of actions to perform in association with the issued strike. As should be appreciated, the method 400 can include more or fewer operations or can arrange the order of the operations differently than those shown in FIG. 4. With reference to FIG. 4, at OPERATION 405, an indication of policy-violating activity 135 by a customer 104 may be received. For instance, a notification 105 reporting policy-violating activity 135 (e.g., infringement activity associated with content 110) may be received by the automated policy enforcement system 100, and upon verification that the reported activity is associated with a customer 104 of the service provider 116, an indication of the policy-violating activity 135 may be provided to the policy handler 208. In some examples, the policy handler 208 may be configured to use the strike engine 220 to determine how to handle the policy-violating activity 135.

At OPERATION 410, customer information associated with the policy violator 125 may be obtained. In some examples, the indication of the policy-violating activity 135 may include the customer information or a customer ID that may be used to obtain the customer information. As described above, the customer information may include information associated with the account holder, and may include, for example, the account holder's name, a mailing address, an email address, user identifier(s) (e.g., an account number, a username, a user identifier (ID)), and category of service information. In some examples, the indication of the policy-violating activity 135 may further include one or more of the attributes extracted from the notification 105, such as a title or filename of the content 110, an IP address used by the policy violator 125 in association with the reported activity, and a date and time of the policy-violating activity 135, etc.

At DECISION OPERATION 415, a determination may be made as to whether policy violator 125 is eligible to be issued a strike corresponding to the policy-violating activity 135 based on the customer information. In some examples, the determination may be based at least in part on the category of service (e.g., residential, multiple-dwelling unit (MDU), business-class, enterprise-class, dedicated Internet Access Service (DIA) class) that the policy violator's account may be designated. For instance, strike issuance may be performed in association with certain categories of service. According to one example implementation, residential customers 104 may be eligible to be issued a strike, while other categories of customers 104 may not be eligible. In some examples, when a determination is made that the policy violator 125 is not eligible to be issued a strike, a communication (e.g., an email, a message, a notification, a task flag) associated with the policy-violating activity 135 and the policy violator's category of service information may be directed to a customer service agent or other appropriate entity. For example, at OPERATION 440, a communication may be directed to and received by the customer service agent or other appropriate entity as an indication to perform a prescribed policy enforcement action (e.g., contact the policy violator 125).

When a determination is made that the policy violator 125 is eligible to be issued a strike (e.g., the policy violator 125 is determined to be a residential customer 104 based on the policy violator's customer information), strike status information associated with the policy violator 125 may be obtained at OPERATION 420. In some examples, the policy violator's strike status information may be stored in a strike data store 214 (shown in FIG. 2) in association with the policy violator's customer ID. The strike status information, for example, may include the customer's current strike level (e.g., 0-n), date and time information of previous strikes that have been issued to/against the policy violator 125 (if applicable), grace period information, etc. The grace period, for example, is a period of time (e.g., days, weeks) that may start when a strike is issued to/against a customer 104 and during which the customer 104 may not be penalized (e.g., the customer's strike level may not be incremented) for additional reported policy-violating activity that may have occurred during the grace period. The grace period information may include an indication about whether a grace period has been applied to the customer's account and if so, the start and end date/time of the grace period.

At DECISION OPERATION 425, a determination may be made at as to whether the reported policy-violating activity 135 occurred during a grace period applied to the policy violator's account. The determination may be made based on the date and time of the policy-violating activity 135 reported in the notification 105 and the grace period information included in the customer's strike status information. For instance, if the policy-violating activity 135 occurs during a grace period, the customer's strike level may not be incremented and corresponding enforcement actions that would normally be performed as a result of the reported policy violating activity may not be executed (e.g., the method 400 may end).

Alternatively, when the policy-violating activity 135 reported in the notification 105 occurs during a grace period applied to the policy violator's account, the method 400 may proceed to OPERATION 430, where the policy violator's strike level may be incremented. For instance, if the user's current strike status information indicates that the policy violator 125 has been previously issued one (1) strike, the next strike level for the policy violator 125 is level two (2). According to an aspect, the customer's strike level may be incremented up to a maximum strike level (n) based on the policy 115. In some examples, a record of the customer's incremented strike level may be communicated to the strike data store 214 for storage.

At OPERATION 435, a set of enforcement actions may be determined based on the customer's incremented strike level. As an example, the policy 115 may include five (5) levels of enforcement actions corresponding to five (5) levels of strikes that may be issued to a customer 104 for reported policy-violating activity 135, and the strike engine 220 may select the set of enforcement actions to perform based on the strike level. As described above, the notification engine 216, the walled garden engine 218, and/or the ticket creation engine 219 may be used to execute the selected set of enforcement actions.

As should be appreciated, the methods 300,400 can be executed as a set of computer-executable instructions executed by a processor, such as a processor of the automated policy enforcement system 100, and encoded or stored on a computer readable medium. Further, the methods 300,400 can be performed by gates or circuits associated with a processor, an ASIC, a FPGA, a SOC, or other hardware device. Although the operations of methods 300, 400 may be executed with reference to the systems, components, devices, modules, software, signals, data structures, interfaces, methods, etc. described herein, it will be understood by those of skill in the art that some or all of the operations of methods 300,400 can be performed by or using different elements from those described.

Figure 5:
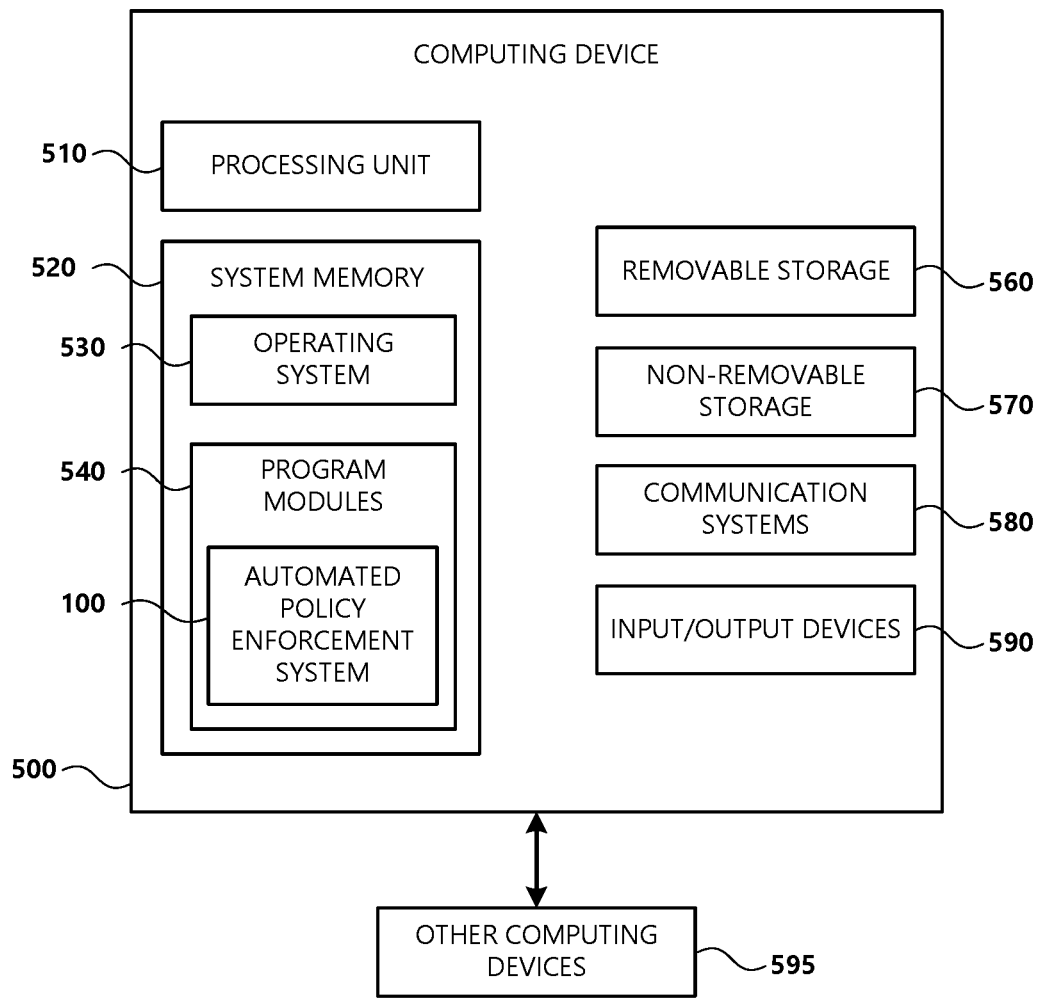
FIG. 5 is a block diagram of a computing device with which one or more aspects of the disclosure may be implemented.

FIG. 5 is a system diagram of a computing device 500 according to an example. The computing device 500, or various components and systems of the computing device 500, may be integrated or associated with the automated policy enforcement system 100. As shown in FIG. 5, the physical components (e.g., hardware) of the computing device 500 are illustrated and these physical components may be used to practice the various aspects of the present disclosure.

The computing device 500 may include at least one processing unit 510 and a system memory 520. The system memory 520 may include, but is not limited to, volatile storage (e.g., random access memory), non-volatile storage (e.g., read-only memory), flash memory, or any combination of such memories. The system memory 520 may also include an operating system 530 that controls the operation of the computing device 500 and one or more program modules 540. The program modules 540 may include the automated policy enforcement system 100, which may be responsible for performing one more of the operations of the methods described above for providing automated policy enforcement. A number of different program modules and data files may be stored in the system memory 520. While executing on the processing unit 510, the program modules 540 may perform the various processes described above.

The computing device 500 may also have additional features or functionality. For example, the computing device 500 may include additional data storage devices (e.g., removable and/or non-removable storage devices) such as, for example, magnetic disks, optical disks, or tape. These additional storage devices are labeled as a removable storage 560 and a non-removable storage 570.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 500 on the single integrated circuit (chip). The disclosure may also be practiced using other technologies capable of performing logical operations such as, for example, AND, OR, and NOT, including but not limited to mechanical, optical, fluidic, and quantum technologies.

The computing device 500 may include one or more communication systems 680 that enable the computing device 500 to communicate with other computing devices 595 such as, for example, routing engines, gateways, signings systems and the like. Examples of communication systems 580 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 500 may also have one or more input devices and/or one or more output devices shown as input/output devices 590. These input/output devices 590 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 520, the removable storage 560, and the non-removable storage 570 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system for providing automated policy enforcement, the system comprising:
   at least one processor;
   memory, operatively connected to the at least one processor and storing computer-readable instructions that, when executed by the at least one processor, cause the system to:
   receive a notification reporting a policy-violating activity performed by a policy violator in association with content;
   validate the notification;
   remove the content;
   determine a set of enforcement actions to perform in response to the policy-violating activity; and
   execute the determined set of enforcement actions,
   wherein in determining the set of enforcement actions to perform, the system is operative to:
   determine the policy violator's strike level, the strike level corresponding to a number of previous policy-violating activities performed by the policy violator;
   determine whether the policy-violating activity occurred during a grace period; and
   only when the policy-violating activity is determined to have not occurred during the grace period, increment the policy violator's strike level.

2. The system of claim 1, wherein in validating the notification, the system is operative to:
   extract an IP address of the policy violator and a date and time of the policy-violating activity from the notification;
   determine whether the IP address of the policy violator matches a dynamic IP address assigned to a customer at the date and time; and
   when a match is determined, obtain customer information of the policy violator.

3. The system of claim 1, wherein when the policy violator's strike level is incremented to a first strike level, the system is operative to:
   block the policy violator's network access by assigning the policy violator to a walled garden according to a first set of walled garden configurations until one or more release conditions have been satisfied; and
   provide a first warning notification to the policy violator.

4. The system of claim 3, wherein the one or more release conditions include an acknowledgment of the policy-violating activity by the policy violator.

5. The system of claim 4, wherein the system is further operative to apply the grace period.

6. The system of claim 4, wherein the acknowledgement is received via an acknowledgement document accessible to the policy violator by at least one of:
   the first warning notification;
   a website included in the walled garden.

7. The system of claim 3, wherein when the policy violator's strike level is incremented to a second strike level, the system is operative to:
   block the policy violator's network access by assigning the policy violator to a walled garden according to a second set of walled garden configurations until one or more release conditions have been satisfied; and
   provide a second warning notification to the policy violator.

8. The system of claim 7, wherein the one or more release conditions include an acknowledgment of the policy-violating activity by the policy violator.

9. The system of claim 7, wherein when the policy violator's strike level is incremented to a third strike level, the system is operative to:
   block the policy violator's network access by assigning the policy violator to a walled garden according to a third set of walled garden configurations until one or more release conditions have been satisfied; and
   provide a third warning notification to the policy violator.

10. The system of claim 9, wherein the one or more release conditions include a consultation with a technical support agent.

11. The system of claim 10, wherein the system is further operative to generate a ticket communicated to the technical support agent notifying the technical support agent to contact the policy violator.

12. The system of claim 11, wherein the system is further operative to:
verify the policy violator's contact information; and
include the policy violator's verified contact information in the ticket.

13. The system of claim 9, wherein when the policy violator's strike level is incremented to a fourth strike level, the system is operative to:
block the policy violator's network access by assigning the policy violator to a walled garden according to a fourth set of walled garden configurations until one or more release conditions have been satisfied; and
provide a fourth warning notification to the policy violator.

14. The system of claim 13, wherein the one or more release conditions include a consultation with a trust and safety agent.

15. The system of claim 13, wherein when the policy violator's strike level is incremented to a fifth strike level, the system is operative to
block the policy violator's network access by assigning the policy violator to a walled garden according to a fifth set of walled garden configurations; and
terminate the policy violator's service.

16. A method for providing automated policy enforcement, comprising:
receiving a notification reporting a policy-violating activity performed by a policy violator in association with content;
extracting an IP address of the policy violator and a date and time of the policy-violating activity from the notification;
determining whether the IP address of the policy violator matches a dynamic IP address assigned to a customer at the date and time; and
when a match is determined, obtaining customer information of the policy violator;
removing the content;
determining a set of enforcement actions to perform in response to the policy-violating activity; and
executing the determined set of enforcement actions,
wherein determining the set of enforcement actions to perform comprises:
determining the policy violator's strike level, the strike level corresponding to a number of previous policy-violating activities performed by the policy violator;
determining whether the policy-violating activity occurred during a grace period; and
only when the policy-violating activity is determined to have not occurred during the grace period, incrementing the policy violator's strike level.

17. The method of claim 16, comprising:
when the policy violator's strike level is incremented to a first strike level:
blocking the policy violator's network access by assigning the policy violator to a walled garden according to a first set of walled garden configurations until one or more release conditions have been satisfied; and
providing a first warning notification to the policy violator;
when the policy violator's strike level is incremented to a second strike level:
blocking the policy violator's network access by assigning the policy violator to a walled garden according to a second set of walled garden configurations until one or more release conditions have been satisfied; and
providing a second warning notification to the policy violator;
when the policy violator's strike level is incremented to a third strike level:
blocking the policy violator's network access by assigning the policy violator to a walled garden according to a third set of walled garden configurations until one or more release conditions have been satisfied; and
providing a third warning notification to the policy violator;
when the policy violator's strike level is incremented to a fourth strike level:
blocking the policy violator's network access by assigning the policy violator to a walled garden according to a fourth set of walled garden configurations until one or more release conditions have been satisfied; and
providing a fourth warning notification to the policy violator; and
when the policy violator's strike level is incremented to a fifth strike level:
blocking the policy violator's network access by assigning the policy violator to a walled garden according to a fifth set of walled garden configurations; and
terminating the policy violator's service.

18. A computing system, comprising:
at least one processor; and
memory, operatively connected to the at least one processor and storing instructions that, when executed by the at least one processor, cause the system to perform a method for providing automated policy enforcement, the method comprising steps to:
receive a notification reporting a policy-violating activity performed by a policy violator in association with content;
remove the content;
increment a strike level associated with the policy violator, wherein incrementing the strike level associated with the policy violator only occurs when the policy-violating activity is determined to have not occurred during a grace period;
determine a set of enforcement actions to perform based on the incremented strike level; and
execute the determined set of enforcement actions, wherein:
the enforcement actions associated with the first strike level include:
a block of the policy violator's network access by assigning the policy violator to a walled garden according to a first set of walled garden configurations until one or more release conditions have been satisfied; and
a first warning notification provided to the policy violator;
the enforcement actions associated with the second strike level include:
a block of the policy violator's network access by assigning the policy violator to a walled garden according to a second set of walled garden configurations until one or more release conditions have been satisfied; and
a second warning notification provided to the policy violator;

the enforcement actions associated with the third strike level include:
- a block of the policy violator's network access by assigning the policy violator to a walled garden according to a third set of walled garden configurations until one or more release conditions have been satisfied; and
- a third warning notification provided to the policy violator;

the enforcement actions associated with the fourth strike level include:
- a block of the policy violator's network access by assigning the policy violator to a walled garden according to a fourth set of walled garden configurations until one or more release conditions have been satisfied; and
- a fourth warning notification provided to the policy violator; and the enforcement actions associated with the fifth strike level include:
- a block of the policy violator's network access by assigning the policy violator to a walled garden according to a fifth set of walled garden configurations; and
- a termination of the policy violator's service.

* * * * *